Patented Aug. 31, 1948

2,448,505

UNITED STATES PATENT OFFICE 2,448,505

PAINT CONTAINING AN ALKYD RESIN AND A HALOGENATED AMINE

Paul Zurcher, Ponca City, Okla., assignor to Continental Oil Company, Ponca City, Okla., a corporation of Delaware No Drawing. Application February 27, 1942, Serial No. 432,647

10 Claims. (Cl. 260—32.6)

My invention relates to a paint and more particularly to an improved paint carrying a small percentage by weight of a halogenated amine.

Synthetic and semi-synthetic paints have the defect of being very thin. When applied on vertical surfaces they have a tendency to run. On both horizontal and vertical surfaces, the freshly applied paint film, because of its thinness, recedes from minute elevations or pin points, leaving them unprotected. In addition to thinness, these paints are deficient in hiding power and, upon drying, the film develops what is known to the art as "orange peel."

An important object of my invention is to provide a paint having incorporated therein an addition agent which will improve the working quality of the paint, lengthen the life of the paint film, increase the hiding power of the film and enhance the smoothness or texture of the film surface.

In my copending applications, Serial No. 296,445, filed September 25, 1939, and Serial No. 423,054, filed December 15, 1941, both now abandoned I disclose the beneficial and improved results obtained from the addition of small percentages of aromatic or aliphatic amines to a paint. My copending application, Serial No. 368,227, filed December 2, 1940 now abandoned, discloses how the properties of the paint can be further modified by the addition of both a halogenated organic compound and an amine.

I have now discovered that, if a small amount between approximately .05 per cent and approximately 2.5 per cent of a halogenated amine is added to the paint, improved results are achieved that are not achieved by the addition of an amine alone or both an amine and a halogenated organic compound not containing the amino group. Amounts substantially less than .05 per cent are ineffectual and amounts substantially greater than 2.5 per cent greatly retard the drying time of the paint and have an adverse rather than beneficial effect on its hiding power, workability and surface appearance.

Such compounds as ortho-chloro-aniline; meta-chloro-aniline; para-chloro-aniline; 1, 2, 3 chloro-toluidine; 1, 2, 4 chloro-toluidine; 1, 2, 5 bromo-toluidine; 1, 2, 3, 4 chloro-xylidine; and 1, 2, 4, 6 chloro-xylidene (in the last five compounds listed, the last number designates the position of the halogen atom) and poly-halogenated amines such as dichloro-amyl-amine, tribromo-butylamine, tribromo-xylidines, tetrachloro-toluidine, and other halogenated amines in this class of compounds, when added to a paint in small quantities, lengthen the life of the paint film, improve its hiding power, its working quality and the texture of its surface.

By way of illustration and not by way of limitation, the following examples of the improvement obtained with my invention are given.

In one test, a paint of the following composition was used to demonstrate the improved results obtained by adding a small amount of a halogenated amine as compared with the addition of a halogenated organic compound plus an amine.

Pigment, 35 per cent (titanium dioxide 85 per cent and zinc oxide 15 per cent.)
Vehicle, 65 per cent (alkyd resin solution).

This paint, when prepared, was very thin and its hiding power was very poor. In addition, upon drying, it developed an orange peel. When 0.5 part by weight of the halogenated organic compound methyl-dichloro-stearate and 0.5 part by weight of triamyl-amine was incorporated with 100 parts of this paint, the orange peel was eliminated. However, the viscosity of the paint was not increased and the hiding power thereof was not improved. One half of one per cent by weight of the halogenated organic compound methyl-dichloro-stearate and 0.3 per cent by weight of aniline were mixed with another sample of the paint. The paint film did not develop orange peel and the viscosity was increased. While the flowing property was reduced, the paint still sagged when applied to vertical surfaces. When 0.4 per cent by weight of the halogenated amine ortho-chloro-aniline was added to a third sample of the paint, the sagging tendency of the film was corrected; the brushing quality of the paint was greattly improved; the flow of the paint was excellent; and the hiding power of the film was improved. When 0.4 per cent by weight of the halogenated amine meta-chloro-aniline was incorporated with another sample of the paint, still other qualities were developed. The surface of the paint film was reduced to satin although the hiding power was not greatly affected.

In order to further test the effect of the halogenated amines on the paint, I selected two other samples. To one of the two samples I added one per cent para-chloro-aniline in a concentrated solution of toluol and, to the other of the two samples I added an identical amount of toluol but without the para-chloro-aniline. The sample containing the para-chloro-aniline, when applied to a test panel, had excellent brushing qualities and the surface was smooth and satiny. The hiding power of the paint was noticeably improved. The sample containing toluol but not para-chloro-aniline remained thin and difficult to apply and its hiding power was only slightly improved.

In another test, a paint of the following composition was used.

Pigment, 28 per cent (titanium dioxide).
Vehicle, 72 per cent (alkyd resin-ester gum solution).

The brushing quality of this paint was very poor. When 0.3 per cent of the halogenated amine ortho-chloro-aniline was added to the paint, its brushing quality was excellent and the other properties of the paint were not affected.

In another test, a buff enamel of the following composition was prepared.

Pigment, 31 per cent (titanated lithopone, 62%, and French ochre 38%).
Vehicle, 69 per cent (resin, 10.6%, oiticica and castor oils 36.4%, drier 1.2%, and volatile 51.8%).

This enamel was thin, dry in the brush, of medium gloss, and showed fine streaks when dried. When 0.2 per cent of the halogenated amine para-chloro-aniline was added to the enamel, its viscosity was improved, its surface was much more glossy, and no streaks were observed when the enamel dried.

0.2 per cent meta-chloro-aniline, 0.5 per cent 1, 2, 4 chloro-toluidine, 1.5 per cent chloro-di-amylamine, 0.8 per cent 1, 2, 3, 4 chloro-xylidene and 1.2 per cent dichloro-tributylamine were each added to separate samples of the above enamel and each increased the viscosity and enhanced the gloss of the enamel. Also, each of these halogenated amines eliminated the tendency of the enamel to form streaks when drying.

The halogenated amines, when incorporated as addition agents in the synthetic and semi-synthetic paints, affected the qualities of these paints differently than addition agents comprising amines alone or halogenated organic compounds plus an amine.

I do not understand why my invention produces improved results or why it produces results different from those achieved by an amine alone or a halogenated organic compound plus an amine. My application for a patent rests upon the improved result obtained and not upon any theory to support it. However, it will be seen that I have accomplished the objects of my invention. I have produced a paint having an improved working or brushing quality and in which the paint film has a longer life, a smoother and glossier surface and increased hiding power.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, I claim:

1. A paint composition comprising an alkyd resin as a principal vehicle and normally deficient in hiding power containing a halogenated amine in an amount sufficient to increase the hiding power of the paint.

2. A paint composition comprising an alkyd resin as a principal vehicle and normally deficient in hiding power containing from .05 per cent to 2.5 per cent of a halogenated amine.

3. A paint composition comprising an alkyd resin as a principal vehicle and normally deficient in hiding power containing from .05 per cent to 2.5 per cent of a halogenated aromatic amine.

4. A paint composition comprising an alkyd resin as a principal vehicle and normally deficient in hiding power containing from .05 per cent to 2.5 per cent of a chlorinated aromatic amine.

5. A paint composition comprising an alkyd resin as a principal vehicle and normally deficient in hiding power containing from .05 per cent to 2.5 per cent of a para-chloro-aniline.

6. A paint composition comprising an alkyd resin as a principal vehicle and normally deficient in hiding power containing from .05 per cent to 2.5 per cent of 1, 2, 4, 5 chloro-xylidene.

7. A paint composition comprising an alkyd resin as a principal vehicle and normally deficient in hiding power containing from .05 per cent to 2.5 per cent of a halogenated aliphatic amine.

8. A paint composition comprising an alkyd resin as a principal vehicle and normally deficient in hiding power containing from .05 per cent to 2.5 per cent of a chlorinated aliphatic amine.

9. A paint composition comprising an alkyd resin as a principal vehicle and normally deficient in hiding power containing from .05 per cent to 2.5 per cent of chloro-iso-tributyl-amine.

10. A method of increasing the hiding power of a paint containing an alkyd resin as a principal vehicle comprising adding to the paint a halogenated amine in an amount from 0.05% to 2.5% to improve its hiding power.

PAUL ZURCHER.

REFERENCES CITED

The following references are of record in the file of this patent:

UNITED STATES PATENTS

| Number | Name | Date |
| --- | --- | --- |
| 1,015,156 | Eichengrun | Jan. 16, 1912 |
| 1,641,413 | Carroll | Sept. 6, 1927 |
| 2,287,188 | Matheson et al. | June 23, 1942 |